United States Patent
Dunn

(10) Patent No.: US 6,236,138 B1
(45) Date of Patent: May 22, 2001

(54) ELECTRO MECHANICAL MACHINE AND ARMATURE STRUCTURE THEREFOR

(75) Inventor: Stanley E. Dunn, Boca Raton, FL (US)

(73) Assignee: David H. Rush, Tamarac, FL (US)

( * ) Notice: Subject to any disclaimer, the term of this patent is extended or adjusted under 35 U.S.C. 154(b) by 0 days.

(21) Appl. No.: 09/402,113

(22) PCT Filed: Jun. 21, 1999

(86) PCT No.: PCT/US99/14177

§ 371 Date: May 19, 2000

§ 102(e) Date: May 19, 2000

(87) PCT Pub. No.: WO99/67872

PCT Pub. Date: Dec. 29, 1999

Related U.S. Application Data

(60) Provisional application No. 60/090,792, filed on Jun. 25, 1998.

(51) Int. Cl.$^7$ ............................. H02K 23/54; H02K 1/22
(52) U.S. Cl. ...................... 310/268; 310/154; 310/179; 310/180; 310/206; 310/261
(58) Field of Search .................................... 310/154, 179, 310/180, 203, 206, 208, 261, 264, 268

(56) References Cited

U.S. PATENT DOCUMENTS

| | | | |
|---|---|---|---|
| Re. 33,628 | 7/1991 | Hahn | 23/4 |
| 3,621,311 | * 11/1971 | Von Starck | 310/207 |
| 3,699,371 | * 10/1972 | Henry-Baudot | 310/207 |
| 3,912,956 | 10/1975 | Muller | 310/68 |
| 4,207,483 | 6/1980 | Baer | 310/49 |
| 5,646,467 | 7/1997 | Floresta et al. | 310/268 |

FOREIGN PATENT DOCUMENTS

| | | | |
|---|---|---|---|
| 2348641 | * 4/1975 | (DE) | H02K/3/04 |
| 57-196858 | * 12/1982 | (JP) | H02K/23/54 |

* cited by examiner

Primary Examiner—Nestor Ramirez
Assistant Examiner—B Mullins
(74) Attorney, Agent, or Firm—Darby & Darby

(57) ABSTRACT

The coils on the disc-type armature of an electro mechanical machine are all wound in the same direction (rotational sense). The coils on each face of the armature are formed into at least two series connected groups of coils which are disposed on the surface of the member so that each coil of one group is located between two coils from another group, and the two coils at one end of the interleaved groups are connected together. Power is commutated to the two coils at the opposite end of the groups of coils, so they conduct current in opposite directions

13 Claims, 5 Drawing Sheets

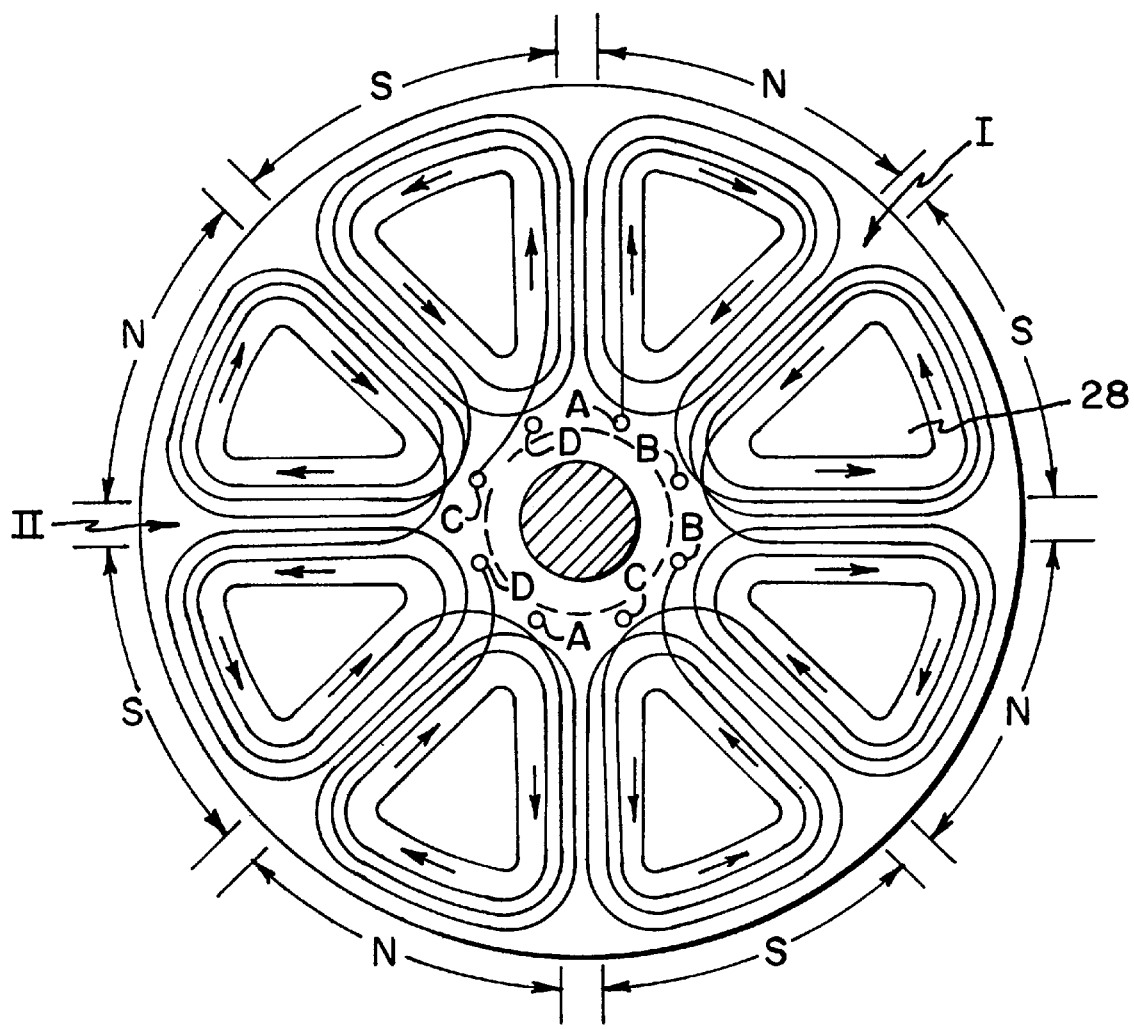

ELECTRO MECHANICAL MACHINE AND ARMATURE STRUCTURE THEREFOR

This patent application claims the priority of U.S. Provisional Patent Application No. 06/090,792 filed Jun. 25, 1998.

FIELD OF THE INVENTION

The present invention relates generally to electro mechanical machines, and more particularly, to such machines utilizing a disc-type armature.

This application is a 371 of PCT/US99/14177 filed Jun. 21, 1999 which claims benefit of provisional application No. 60/090,792 filed Jun. 25, 1998.

BACKGROUND OF THE INVENTION

Electric DC motors have experienced difficulty in finding acceptance in certain types of applications requiring a high operating torque, such as vehicles, lawn mowers and certain types of tools. Until the present invention, it was not possible to achieve sufficient torque and reasonable efficiency with a machine of sufficiently compact size. Efficiency is particularly important because of the relatively limited nature of the DC power source, typically a battery.

U.S. Pat. No. RE. 33,628 issued on Jul. 2, 1991, discloses a particularly efficient electro mechanical machine which has a field producing assembly, which serves as a stator and is mounted in a housing so as to define an axial air gap which is circumferentially disposed about an axis of rotation. The field assembly is structured to produce a circumferential distribution of magnetic flux in the air gap having P periodic extremes of flux density about the axis. A disc-shaped electrical assembly, serving as an armature is positioned in the air gap, and mounted so that the armature and field assembly are rotatable relative to each other. The armature has a circular array of C non-overlapping coils on each of its front and back faces, the coils on one face being angularly offset from the coils on the other face and each having the same arcuate extent, smaller than 360 degrees divided by P. The coils are arranged in groups of serially connected coils with each group occupying an unique area of an armature face. Inasmuch as adjacent coils are exposed to opposite extremes of the flux, they must have current flow in opposite directions. This is achieved by winding adjacent coils in opposite directions.

The present invention realizes improvements to the machine disclosed in U.S. Pat. No. RE 33,628 which substantially increases the torque. Specifically, the structure of the armature is modified, so as to halve the number of parallel circuits without reducing the number of coils, which substantially reduces the rotational speed, increasing the torque. In addition, the commutation system, which couples power to the motor, is modified to increase the percentage of time all of the coils in the armature are energized. Increased torque at a given horsepower means that torque requirements can be met by smaller, lower power motors. The savings in cost, weight and size are significant, not to mention the more efficient use of energy.

BRIEF DESCRIPTION OF THE DRAWINGS

The foregoing and other features and advantages of the present invention will be understood more clearly from the following detailed description thereof when read in conjunction with the accompanying drawings, in which:

FIGS. 2A and 2B illustrate the two sides of an electrical member utilized in a prior art machine;

DESCRIPTION OF THE PREFERRED EMBODIMENTS

Figure 1:
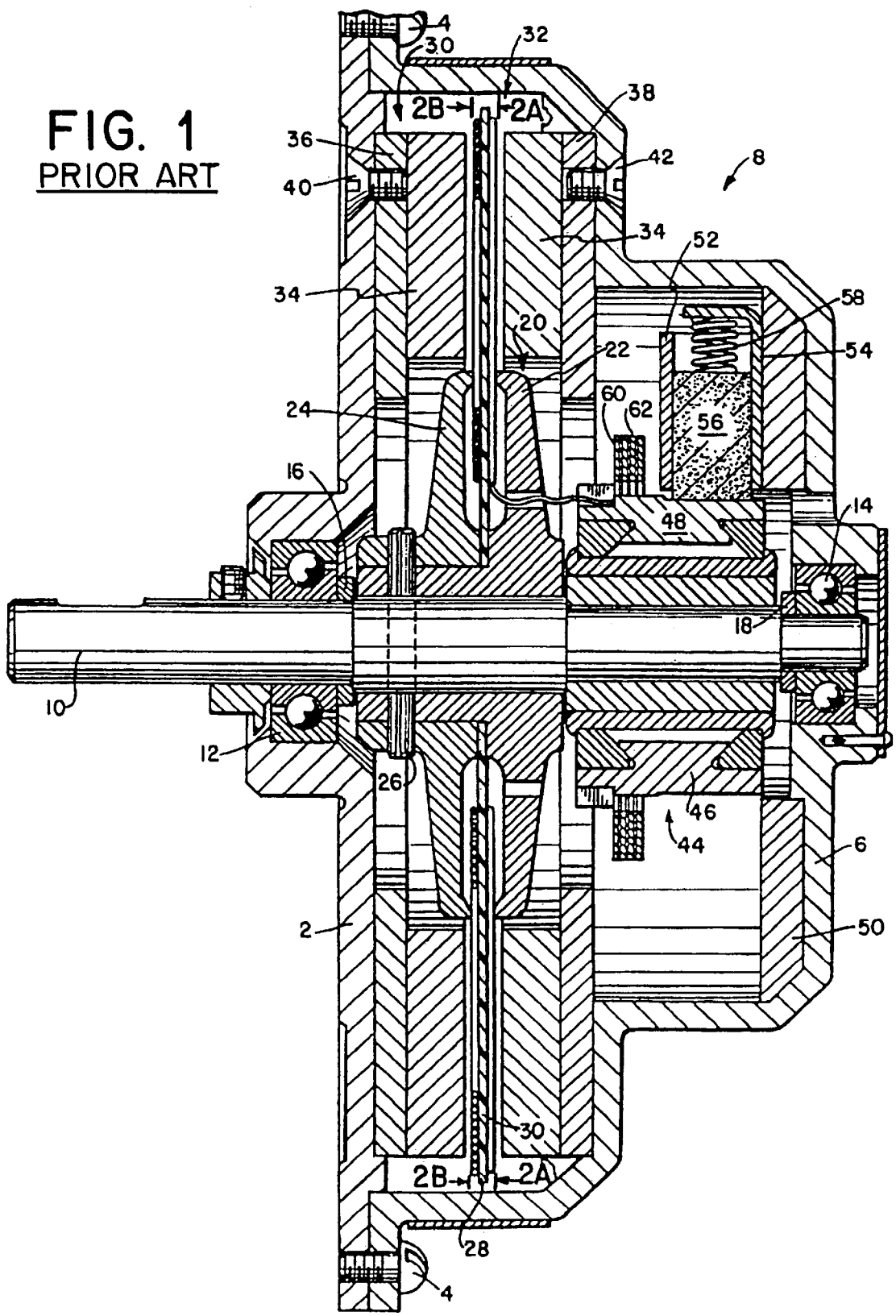
FIG. 1 is an axial, cross-sectional view of an electromechanical machine embodying the present invention.

Turning now to FIG. 1, there is illustrated a cross-sectional plan view of an electromechanical machine utilizing a disc-type armature of the same type as disclosed in U.S. Pat. No. RE 33,628. A housing-half 2 is connected, by any conventional means, for example screws, one of which is indicated at 4, to another housing-half 6 to form the machine housing indicated generally at 8. Rotatably mounted within the housing 8 by means of front bearings 12 and rear bearings 14 is a shaft 10. Washers 16 and 18 are positioned between the shaft 10 and the front and rear bearings, respectively.

Within the housing 8 and mounted about the shaft 10 is an armature hub indicated generally at 20 which includes hub-half 22 and hub-half 24. The hub halves 22 and 24 are connected to one another and to the shaft so as to rotate therewith, as by a roll pin 26 passing through the two hub halves and the shaft 10. Suitably secured between the two hub halves 22 and 24 so as to rotate therewith is a disc-shaped rotor 28 made of a nonconducting, non-magnetic material, such as, for example, a phenolic. Secured to the rotor 28 as by adhesive or the like are a plurality of conducting wires forming armature coils 30, which will be more fully discussed below.

Fixedly connected to the machine housing 8 are first and second spaced field members, indicated at 30 and 32, which in the illustrative embodiment are stator members, but those skilled in the art will appreciate that the role of the stator and rotor are readily interchanged. Each of the stator members 30 and 32 includes a plurality of flat pie-segmented permanent magnets, indicated at 34, which may, for example, be constructed of ceramic ferrite or rare earth material. Each of the permanent magnets 34 is magnetized through its thickness, so one face is of one polarity and the other face of opposite polarity. The magnets may be fixedly secured to a metal backing plate in the form of a ring made, for example, of soft iron or steel, the two back-up rings being indicated at 36 and 38, respectively. The two back-up rings are fixedly connected to the housing 8 by any conventional means, for example, by countersunk screws, indicated at 40 and 42, respectively. Alternatively, the stators may be formed of ceramic ferrite discs, suitably magnetized to form the field poles.

Fixedly connected to the shaft 10 and rotating therewith is a commutator indicated generally at 44. The commutator 44 includes a plurality of segments or bars of a conductive material, such as, for example, copper, suitably isolated from one another by, for example, mica. The commutator is, of course, also electrically isolated from the armature shaft 10 on which it is mounted. Two of the copper bars of the commutator are indicated at 46 and 48. Fixed to the rear housing 6 is a brush holder mount 50 to which is attached a brush holder 52 and a brush holder clip 54. A brush 56 is positioned between the brush holder 52 and the brush holder clip 54 and is maintained in electrical contact with the commutator bar 46 by a spring 58 positioned between the brush 56 and the brush holder clip 54. Other brushes, as needed, are similarly mounted in relation to the commutator.

The permanent magnets 34 of the stator may advantageously be made of a ceramic ferrite or rare earth material and the back-up ring may be made of a magnetic material such as a soft iron or steel. It should be noted that the magnets 34 may be adhered, by means of an elastic cement, for example, to the soft steel back-up ring before the stator is magnetized.

It is further noted that the individual pole pieces have a pie-segmented configuration so that the pole area for each is maximized. It is also possible to utilize a continuous ring of ceramic ferrite, magnetizing adjacent sections in alternate polarity, although this is less desirable since such a continuous ceramic ferrite structure is frangible and subject to breakage, even when adhered by means of an elastic glue to the magnetic back-up ring. Utilizing individual pie-segmented pole pieces is preferable since there is some reduction in total pole area and substantial reduction in the likelihood of stator breakage.

In the embodiment discussed above, the number P of magnetic field poles in the machine is equal to the number of extremes of flux density (of either polarity) in the gap through which the armature rotates. As defined in this specification, the term "flux density extreme" refers to the maxima and minima (i.e., the crests and valleys) on a graph of flux density versus rotational angle in the air gap (as a circular path is traveled about the axis). It will be appreciated that the maximum and minimum values of flux density in the above-described embodiment occur respectively at the mid-points of the north and south poles, where the north poles have been arbitrarily assigned a positive flux density and the south poles a negative flux density. In such a graph, the maxima (or crests) occur at the greatest positive values of flux density (i.e., the north poles), and the minima (or valleys) occur at the greatest negative values of flux density (i.e., the south poles). As such, the number P of extrema in the embodiment being discussed is equal to the number of pairs of opposed magnets 34 on the field members 30 or 32. However, it should be noted that the number P of flux density extrema in other embodiments need not equal the actual number of magnets or magnet pairs.

In summary, the disclosed field producing assembly, which here serves as a stator, defines an axial air gap which is circumferentially disposed about an axis of rotation and is constructed to produce a circumferential distribution of magnetic flux in the air gap having P periodic extremes of flux density about the axis.

Figure 2B:
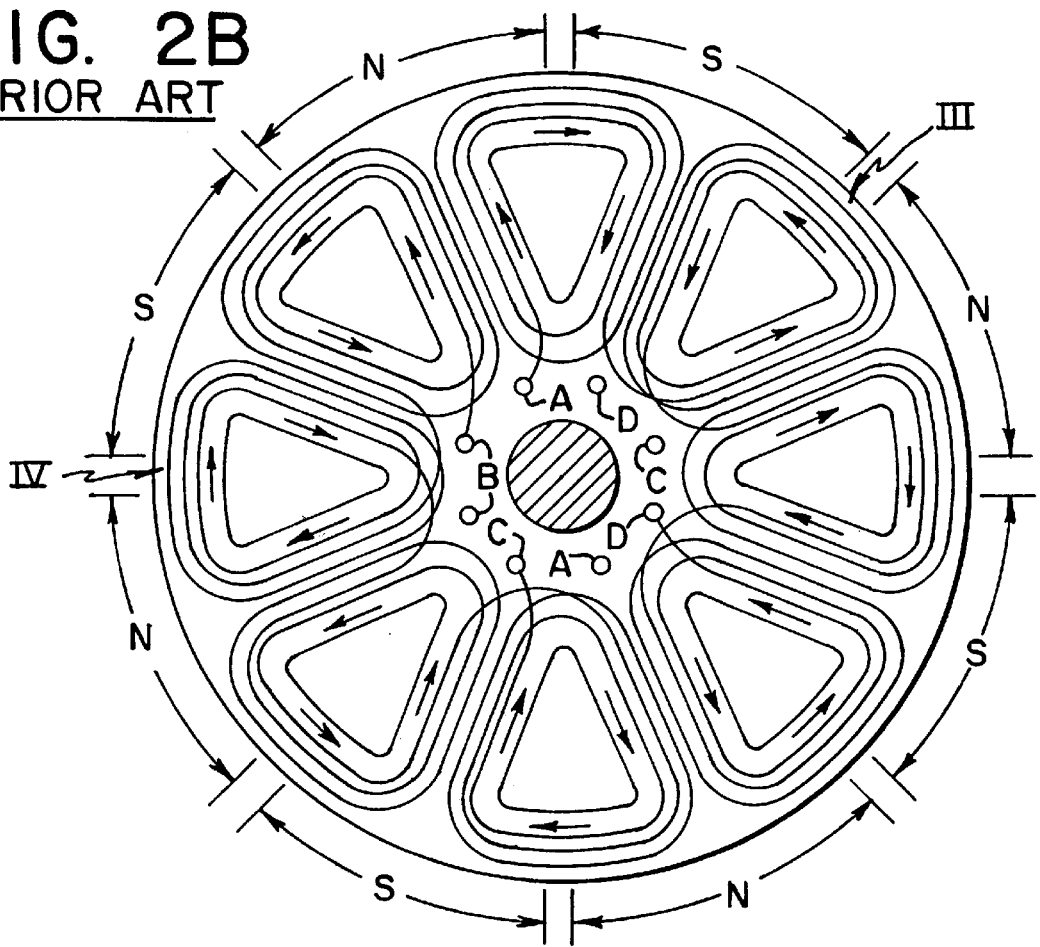

Turning now to FIGS. 2A and 2B, there are illustrated the two sides of a winding pattern for an eight-pole electrical member including four groups of armature coils, serving as a rotor, in accordance with patent RE 33,628. It will be noted that in this illustration four wires are utilized, each wire forming a series group of coils on one-half of a face of the rotor disc 28.

As seen in FIG. 2A, on the front face of the rotor one wire forms the four right-hand coils, and extends from a point A successively through four coils to point B. A second wire extends from point C successively through four coils to point D. The coils are arranged so that current will flow in the same direction through the side-by-side conductors of adjoining coils. In other words, the winding direction is reversed on adjacent coils. On the rear face of the rotor, as seen in FIG. 2B, the coils are staggered 90 electrical degrees (one-half of the pitch angle of the stator poles) clockwise with respect to those on the front face. It should be understood that the rotor in FIG. 2B is depicted in relation to the same magnetic poles shown in FIG. 2A but which are reversed in the rear view. On this rear face, one wire starts at point B and extends through four successive coils to point C, while a further wire starts at point A and extends through four successive coils to point D. As shown below, points A, B, C, D are connected to respective sets of commutator segments. By winding each group of coils from a single piece of wire, a maximum of 8 connections to the commutator becomes necessary, regardless of the number of field poles.

In manufacture, it has been the practice to wind the wire on a form to form coils which conform to the shape of the stator pole area. The wires are wound so that there is no overlap of the turns and they are therefore only a single layer thick. The coils are then suitably adhered or otherwise secured to the rotor disc and connected as stated to the points A, B, C, D. It will thus be seen that the armature is a thin structure made up of only the thickness of the insulating disc plus the thickness of two layers of the wire utilized, one layer of wire being on each side of the disc.

In summary, the disc-shaped electrical assembly, here serving as an armature, is positioned in the air gap, and mounted so that the armature and field assembly are rotatable relative to each other. The armature has a circular array of C non-overlapping coils on each of its front and back faces, the coils on one face being angularly offset from the coils on the other face and each having the same arcuate extent, smaller than 360 degrees divided by P.

Figure 3:
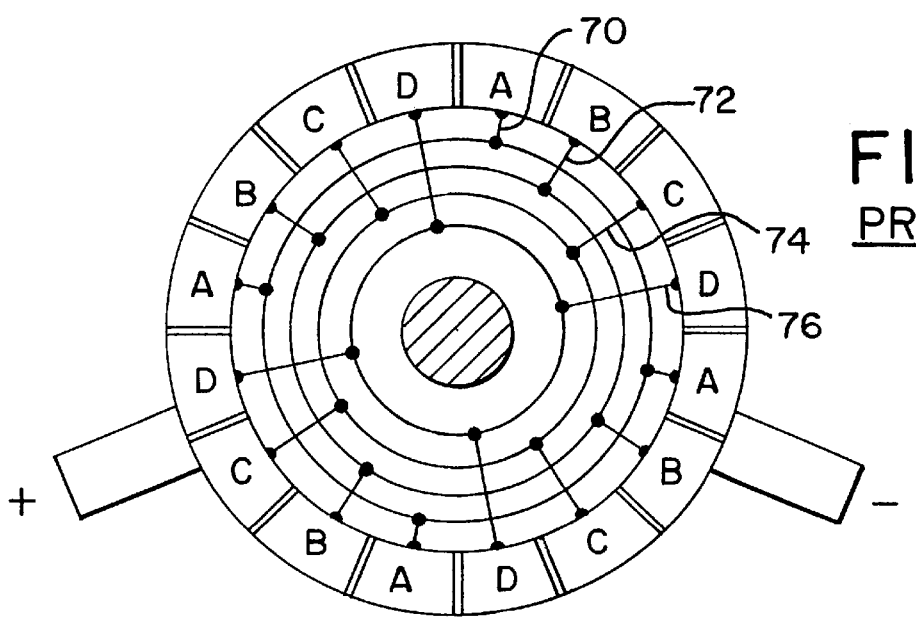
FIG. 3 is a schematic diagram of a commutator arrangement for use with the electrical member or armature of FIGS. 2A and 2B.

Turning now to FIG. 3, there is illustrated a schematic diagram of a commutator for use with the armature illustrated in FIGS. 2A and 2B. Commutator 44 is arranged to have twice as many segments or bars as there are field poles. In this illustration there are four segments for each pair of stator poles and every fourth one of the sixteen segments forming the commutator (i.e., those indicated by the respective letters A, B, C and D) are electrically connected to one another by respective conductors, indicated at 70, 72, 74 and 76. Such connections may be readily made by use of stamped jumper rings 62 (FIG. 1). The commutator segments A, B, C, D are respectively connected to points A, B, C, D on the rotor windings of FIGS. 2A and 2B. The index markings in FIGS. 2A, 2B and 3 are utilized to enable the appropriate alignment of the commutator, the armature and the stator for maximum efficiency of operation of the machine. The maximum brush width is preferably approximately 60% to 90% of the commutator bar width. Although such an arrangement gives a varying resistance as the armature rotates, the torque remains quite stable.

The two commutator brushes are positioned at an angle such that one brush straddles segments A-B when the other straddles segments D-C. If there are N pole pairs, then the brush separation is (n+½) (360°/N), where n is any integer from zero to N. For higher currents, several pairs of brushes may be used, each additional pair being spaced from the first pair by 90° or a multiple thereof. Since brushes spaced by such intervals will contact inter-connected segments, such brushes may be connected in parallel. This not only permits larger currents and power, but reduces commutator arcing and ring fire.

Figure 4:
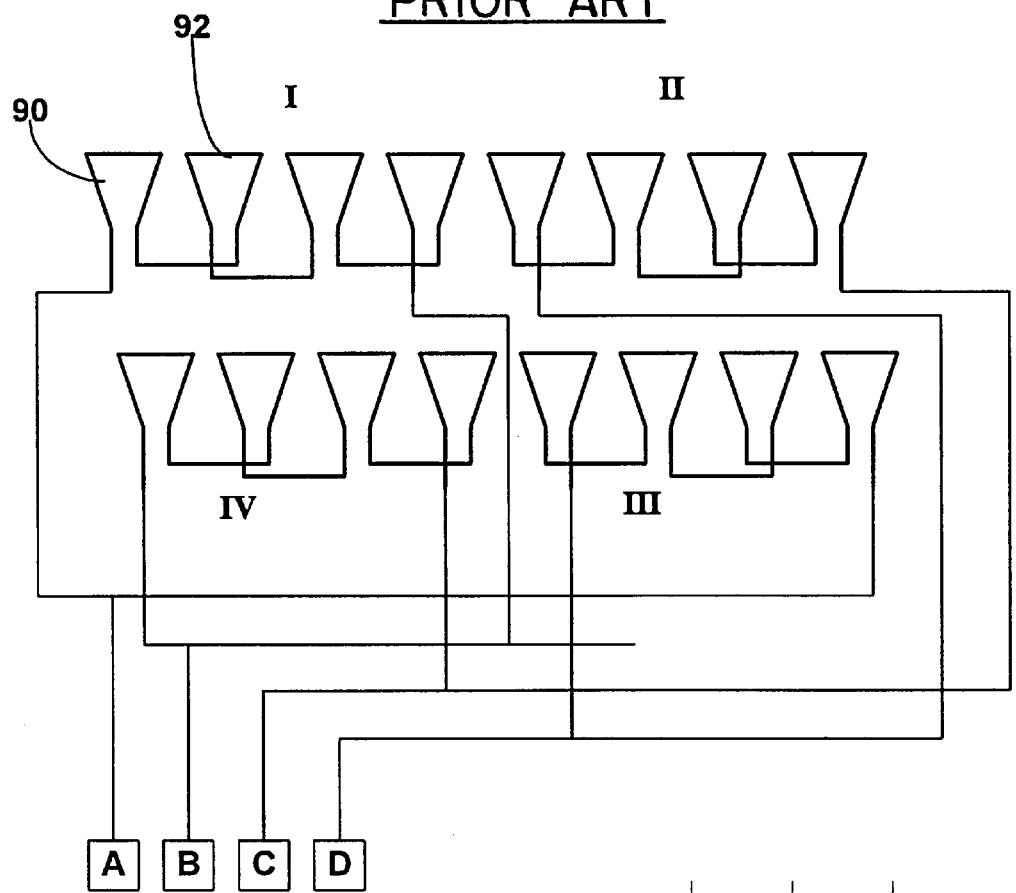
FIG. 4 is a schematic diagram illustrating the operation of the electrical member of FIGS. 2A and 2B with the commutator of FIG. 3.

FIG. 4 is a schematic diagram illustrating the operation of the electrical member of FIGS. 2A and 2B with the commutating structure shown in FIG. 3. The four coil groups I, II, III and IV are represented by those reference characters in FIG. 4. Moreover, each coil 28 is represented by an inverted triangle. A coil wound in the clockwise direction, for example, the left hand most coil 90 in coil group I, is shown with two parallel legs extending downwardly. On the other hand, a coil wound in the counterclockwise direction is shown with a cross over between its legs (see for example the coil 92 in coil Group I).

The boxes below the coil groups bearing the letters "A", "B", "C" and "D" represent the commutator segments in FIG. 3, with each block representing all the commutator segments having the same letter. The blocks with the "+" and "−" characters represent the two brushes in FIG. 3, and successive rows show the brushes in successive, different positions relative to the commutator segments. It should be noted that two of the rows include three blocks for the brushes. This is intended to represent the situation in which a single brush overlaps the first and last blocks (i.e. Blocks A and D).

The table to the right of the boxes representing the brushes indicates the condition of the four coil groups for the corresponding relative position between the brushes and commutator. A character "0" indicates that the corresponding coil group is non-conductive, a character "1" indicates that the corresponding coil group conducts in a forward direction (left to right in FIG. 4, clockwise in FIG. 2A, and counterclockwise in FIG. 2B), and a "−1" indicates that the corresponding coil group conducts in the opposite direction.

From FIG. 4, it will be appreciated that all four coil groups are conductive when the brushes (+, −) do not overlap adjacent commutator segments (A, B, C, D), whereas only the coil groups of one commutator face conduct when the brushes overlap adjacent commutator segments. It is desirable to make the brushes nearly the same width as the commutator segments, and the spaces between commutator segments are relatively small. Thus, in operation, the brushes will overlap two commutator segments most of the time and will be in contact with one segment for only an extremely short instant. The machine will therefore operate primarily with half the coils conductive (i.e. the coils on opposite faces alternate). The entire set of coils conducts only during the brief instants during which the brushes do not overlap adjacent segments.

Figure 5:
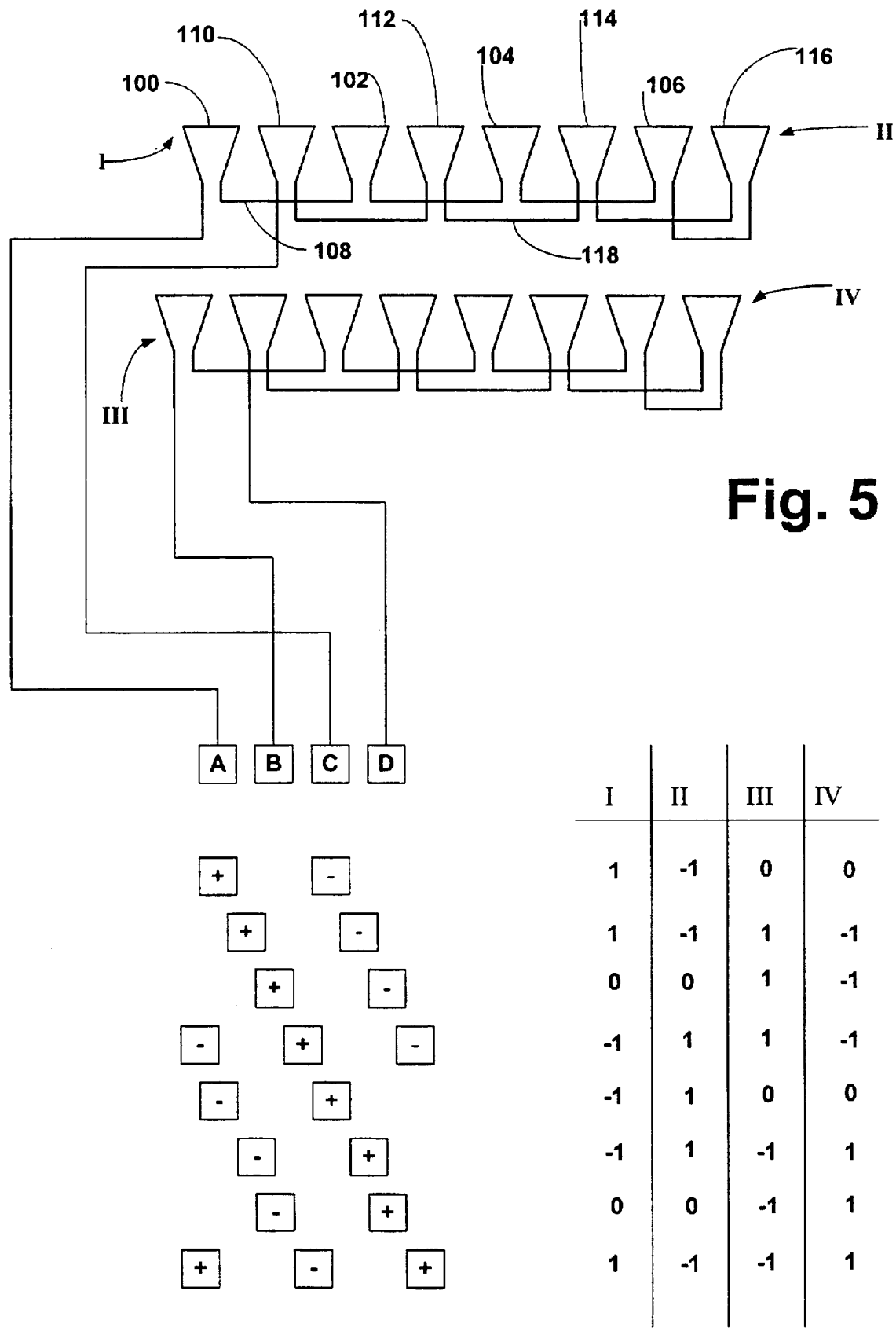
FIG. 5 is a schematic diagram illustrating electrical member embodying the present invention, operating with a commutator of the type illustrated in FIG. 3, also operated in accordance with the present invention.

FIG. 5 is a schematic diagram similar in purpose to FIG. 4 illustrating a coil structure in which each coil group is wound from a single wire and all coils are wound in one continuous direction. For example, coils 100, 102, 104 and 106, which constitute coil group I, are all wound in a clockwise direction from a common, single wire 108. Similarly, coils 110, 112, 114 and 116, which constitute coil group II, are all formed from a single wire 118, also wound in a clockwise direction. The coil groups I and II are no longer restricted to a respective half of the upper surface of the rotor, but are each spread out over the entire surface, with a coil from coil group I being uniformly or evenly interposed between each pair of coils in group II. The free ends of coils 106 and 116 are connected together to place coil groups I and II in series. Coils 100 and 110 are then connected to a switching device (i.e. the commutator), as a result of which coils in group I will always conduct in the opposite direction to coils in group II (i.e. one will conduct in a clockwise direction in a rotor diagram such as FIG. 2A, whereas the other will conduct in the opposite, counterclockwise direction). Coil groups III and IV are similarly arranged and connected.

It will be understood that the machine including the coil groups and commutation represented by FIG. 5 will have the structure shown in FIG. 1. Also the armature may have the structure shown in FIGS. 2A and 2B, except that the winding pattern and location of the coils would be as illustrated in FIG. 5.

The table in FIG. 5 illustrates the operating sequence of the coil groups with relative motion between the commutative segments and brushes, similarly to the table of FIG. 4. It should be noted that all coils are now conductive when the brushes overlap adjacent segments, which represents a large majority of the time. The coils on alternate faces conduct only during the relatively short instants that the brushes are not overlapped. This dramatically increases the active current carrying path length by increasing the amount of time that all the coils in the machine are active. The new connection scheme also reduces the number of parallel current paths and the number of commutator connections by half during this short time, thus increasing its contribution.

In practice, the improved coil connection and commutation scheme typically reduces rotational speed to some 60% of what it was previously. For a motor of a given power (the product of torque and speed), this amounts to a torque increase of 60%. Alternately, for a motor which needs to provide a given torque, a correspondingly smaller amount of power would be consumed, resulting in energy savings. Also, the speed of these machines is proportional to the square of their diameter. Thus, for a given power, it is possible to reduce the diameter of the motor to 78% of its previous size, resulting in dramatic savings in size, weight and cost.

It should be appreciated that the present invention permits much more convenient and efficient winding of the coil groups, while retaining the requisite operating condition that adjacent coils must conduct in opposite directions.

Although the invention has been described with respect to an 8 pole configuration, it will be understood that other numbers of poles may be used, with as few as four poles or more than twelve, depending on the desired size and speed of the motor. For example, 8 to 10 poles may be used for small fractional horsepower motors, and larger numbers of poles for slower speed motors, which would increase horsepower and decrease weight.

Also, the same machine may serve either as a motor or a generator.

Although a preferred embodiment of the invention has been disclosed for illustrative purposes, those skilled in the art will appreciate that many additions, modifications and substitutions are possible without departing from the scope and spirit of the invention as defined in the accompanying claims.

What is claimed is:

1. An electromechanical machine comprising:
   a field producing assembly mounted in said housing so as to define an air gap circumferentially disposed about an axis of rotation, for producing a distribution of magnetic flux varying circumferentially in said gap so as to have P periodic extremes of flux density about said axis;
   an electrical member disposed in said gap, said electrical and field assemblies being mounted for relative rotation, said electrical member having a circular array of C non-overlapping coils on face thereof, C being an integer greater than P/2, the coils being formed into at least two groups of serially connected coils, all wound in the same rotational direction, each coil of one group being disposed between two coils of other groups, the coils at one end of two coil groups having free ends which are connected together; and switching means acting as a commutator between said coil groups and a source of power for selectively connecting power to coils at the other end of said two coil groups as said electrical and field members rotate relative to each other, the switching means connecting power to said coil groups so that said two groups conduct current in opposite directions.

2. An electromechanical machine in accordance with claim 1, wherein said electrical field assembly has front and rear faces and a circular array of C non-overlapping coils on each face thereof, each coil of the coil array on one face being angularly offset about said axis relative to a coil of the coil array on the other face by an amount less than 360°/2C, each coil of each armature face having the same arcuate extent, said arcuate extent being less than 360°/P.

3. An electromechanical machine in accordance with claim 2, wherein said field producing member constitutes a stator and said electrical assembly constitutes an armature rotor, said switching means being a commutator mounted non-rotatably with respect to the armature and rotatably with respect to the field assembly and having a plurality of commutator segments each coupled to a respective end of one of said coil groups.

4. An electromechanical machine in accordance with claim 3, further comprising at least one pair of brushes engaging said commutator, said brushes providing power to said coil pairs through said commutator segments being interconnected to provide P/2 parallel conducting pathways among said coil groups.

5. An electromechanical machine in accordance with claim 2, wherein said field producing member comprises first and second stator members spaced apart to form said gap therebetween, each having a circular array of P magnetic poles of alternately opposite polarity, P being an even integer, each pole of each stator member occupying a substantially equal pole arc sector of the circular array and being aligned opposite an opposite-polarity pole of the other stator member.

6. An electromechanical machine in accordance with claim 1, wherein said field producing member constitutes a stator and said electrical assembly constitutes an armature rotor, said switching means being a commutator mounted non-rotatably with respect to the armature and rotatably with respect to the field assembly and having a plurality of commutator segments each coupled to a respective end of one of said coil groups.

7. An electromechanical machine in accordance with claim 6, further comprising at least one pair of brushes engaging said commutator, said brushes providing power to said coil pairs through said commutator segments.

8. An electromechanical machine in accordance with claim 7, wherein said field producing member comprises first and second stator members spaced apart to form said gap therebetween, each having a circular array of P magnetic poles of alternately opposite polarity, P being an even integer, each pole of each stator member occupying a substantially equal pole arc sector of the circular array and being aligned opposite an opposite-polarity pole of the other stator member.

9. An electromechanical machine in accordance with claim 6, wherein said field producing member comprises first and second stator members spaced apart to form said gap therebetween, each having a circular array of P magnetic poles of alternately opposite polarity, P being an even integer, each pole of each stator member occupying a substantially equal pole arc sector of the circular array and being aligned opposite an opposite-polarity pole of the other stator member.

10. An electromechanical machine in accordance with claim 2, wherein said field producing member comprises first and second stator members spaced apart to form said gap therebetween, each having a circular array of P magnetic poles of alternately opposite polarity, P being an even integer, each pole of each stator member occupying a substantially equal pole arc sector of the circular array and being aligned opposite an opposite-polarity pole of the other stator member.

11. An electromechanical machine in accordance with claim 1, wherein said field producing member comprises first and second stator members spaced apart to form said gap therebetween, each having a circular array of P magnetic poles of alternately opposite polarity, P being an even integer, each pole of each stator member occupying a substantially equal pole arc sector of the circular array and being aligned opposite an opposite-polarity pole of the other stator member.

12. An armature structure for an electromechanical machine, comprising:
   a disc-shaped armature body having front and rear faces;
   a circular array of C non-overlapping coils on face of said body, the coils being formed into at least two groups of serially connected coils, all wound in the same rotational direction, each coil of one group being disposed between two coils of other groups, the coils at one end of two coil groups having free ends which are connected together.

13. An armature structure in accordance with claim 12, wherein the front and rear faces each have a circular array of C non-overlapping coils thereon, each coil of the coil array on one face being angularly offset about said axis relative to a coil of the coil array on the other face by an amount less than 360°/2C, each coil of each armature face having the same arcuate extent.

* * * * *